(12) United States Patent
Shirakata et al.

(10) Patent No.: US 7,309,176 B2
(45) Date of Patent: Dec. 18, 2007

(54) LENS BARREL AND IMAGING APPARATUS

(75) Inventors: Satoshi Shirakata, Tokyo (JP); Hiroaki Tojo, Chiba (JP)

(73) Assignee: Sony Corporation (JP)

( * ) Notice: Subject to any disclaimer, the term of this patent is extended or adjusted under 35 U.S.C. 154(b) by 328 days.

(21) Appl. No.: 11/099,674

(22) Filed: Apr. 6, 2005

(65) Prior Publication Data

US 2005/0265710 A1    Dec. 1, 2005

(30) Foreign Application Priority Data

Apr. 15, 2004    (JP) ............................ P2004-120796

(51) Int. Cl.
*G03B 17/04* (2006.01)
*G02B 15/14* (2006.01)
(52) U.S. Cl. ...................... 396/349; 359/703
(58) Field of Classification Search ................ 396/349, 396/451, 348, 532; 348/335; 359/703, 704, 359/817
See application file for complete search history.

(56) References Cited

U.S. PATENT DOCUMENTS

| | | | |
|---|---|---|---|
| 2002/0044363 A1 | 4/2002 | Takeshita et al. | |
| 2003/0184880 A1 | 10/2003 | Kawanabe | |
| 2004/0067054 A1 | 4/2004 | Ichikawa et al. | |

FOREIGN PATENT DOCUMENTS

| | | | |
|---|---|---|---|
| JP | 2002-357757 | | 12/2002 |
| JP | 2002357757 A | * | 12/2002 |
| JP | 2003-315888 | | 11/2003 |

OTHER PUBLICATIONS

EPO Search Report mailed Apr. 27, 2005.

* cited by examiner

*Primary Examiner*—W. B. Perkey
*Assistant Examiner*—Rishi Suthar
(74) *Attorney, Agent, or Firm*—Rader Fishman & Grauer PLLC; Ronald P. Kananen (57) ABSTRACT

A lens barrel including a base and a collapsible barrel provided so as to collapse into and expand out of the base, the barrel including a lens constituting an image-capturing optical system for introducing an image of an object, a lens frame for holding the lens, and an operational unit provided in the lens frame for performing an operation relating to image capture based on a control signal supplied thereto, the lens barrel including a flexible substrate provided within the lens barrel for supplying the control signal from an electric circuit provided outside the barrel to the operational unit; wherein the flexible substrate has a first interconnect section to which the control signal is supplied; and a second interconnect section provided separately from the first interconnect section and having an end connected onto the lens frame and another end electrically connected to a ground potential.

18 Claims, 11 Drawing Sheets

COLLAPSED CONDITION

FIG. 3B

EXTENDED CONDITION

LENS BARREL AND IMAGING APPARATUS

CROSS REFERENCE TO RELATED APPLICATONS

The present document is based on Japanese Priority Document JP2004-120796, filed to the Japanese Patent Office on Apr. 15, 2004, the contents of which being incorporated herein by reference.

BACKGROUND OF THE INVENTION

1. Field of the Invention

The present invention relates to a lens barrel and to an imaging apparatus.

2. Description of Related Art

When electrostatic charge and discharge occur on a case constituting an outer cover of an imaging apparatus, such as a digital still camera and a digital video camera, electric current flows into an electric circuit provided inside the case therethrough and adversely affects an operation of the electric circuit and electronic components constituting the electric circuit.

Techniques of thus providing an electrically conductive member, which connects the case of an imaging apparatus to a portion having ground potential in the electric circuit, in the apparatus have been known (see, for example, Japanese Patent Application Laid-Open No. 2003-315888 Official Gazette).

SUMMARY OF THE INVENTION

There has been an imaging apparatus having a collapsible lens barrel enabled to collapse into and expand out of a casing. A lens frame for holding a lens is provided in the lens barrel. An operational unit, which operates according to a control signal supplied to this lens frame, is provided therein. Also, a flexible substrate for supplying the control signal to the operational unit from an electric circuit provided outside the lens barrel is disposed in the lens barrel.

There is the risk that when an electrostatic charge or discharge occurs in the lens barrel in a state in which the lens barrel is project forwardly from the case in such an imaging apparatus, electric current due to the charge or the discharge may flow into the flexible substrate from the lens barrel by an air discharge and be transmitted to the electric circuit through the flexible substrate and may adversely affect an operation of the electric circuit and electronic components constituting the electric circuit.

Further, in recent years, the miniaturization of the lens barrel has been achieved, so that the distance between the lens barrel and the flexible substrate has become narrower, and that the transmission of the electrostatic current to the flexible substrate is facilitated.

The present invention has been conceived in view of such circumstances. A preferred embodiment of the present invention provides a lens barrel and an imaging apparatus, which are enabled to effectively prevent adverse effects due to electrostatic current and advantageous in miniaturization thereof.

It is preferable, according to a preferred embodiment of the present invention, to provide a lens barrel including a base and a collapsible barrel provided so as to collapse into and expand out of the base, the barrel including a lens constituting an image-capturing optical system for introducing an image of an object, a lens frame for holding the lens, and an operational unit provided in the lens frame for performing an operation relating to image capture based on a control signal supplied thereto, the lens barrel having a flexible substrate provided within the lens barrel for supplying the control signal from an electric circuit provided outside the barrel to the operational unit; wherein the flexible substrate includes a first interconnect section to which the control signal is supplied; and a second interconnect section provided separately from the first interconnect section and having an end connected onto the lens frame and another end electrically connected to a ground potential.

Also, according to another preferred embodiment of the present invention, there is provided an imaging apparatus including a base, and a collapsible barrel provided to collapse into and expand out of the base, the barrel including a lens constituting an image-capturing optical system for introducing an optical image of an object; an imaging device for imaging the object; a lens frame for holding the lens; and an operational unit provided in the lens frame for performing an operation relating to image capture based on a control signal supplied thereto, the imaging apparatus having a flexible substrate provided within the lens barrel for supplying the control signal from an electric circuit provided outside the barrel to the operational unit; wherein the flexible substrate includes a first interconnect section to which the control signal is supplied; and a second interconnect section provided separately from the first interconnect section and having an end connected onto the lens frame and another end electrically connected to a ground potential.

According to the preferred embodiments of the present invention, when a discharge or a charge occurs at an end of a lens barrel or in the vicinity thereof due to external static electricity and electric current flows during the lens barrel is in a projected state, this current is led to a portion having ground potential through a second interconnect section.

Consequently, the current does not flow into the electric circuit and the imaging device of the imaging apparatus. Thus, the current may be securely prevented from adversely affecting operations of the electric circuit and the imaging device or affecting the electronic components of the electric circuit and the imaging device.

Also, even in a case where the distance between the lens barrel and the flexible substrate is narrow, the adverse effects may be securely prevented by surely leading the electrostatic current a portion having ground potential. Consequently, the preferred embodiment of the present invention is advantageous in miniaturization of the lens barrel and the imaging apparatus.

The benefit of effectively preventing the adverse effects due to the electrostatic current may be achieved by providing the second interconnect section, which is connected to a portion having ground potential, on the flexible substrate disposed in the lens barrel.

BRIEF DESCRIPTION OF THE DRAWINGS

The above and other objects, features and advantages of the present invention will become more apparent from the following description of the presently preferred exemplary embodiments of present invention taken in conjunction with the accompanying drawings, in which.

DESCRIPTION OF THE PREFERRED EMBODIMENTS

Next, an example of preferred embodiment of the present invention is described hereinbelow by referring to the accompanying drawings.

Figure 1:
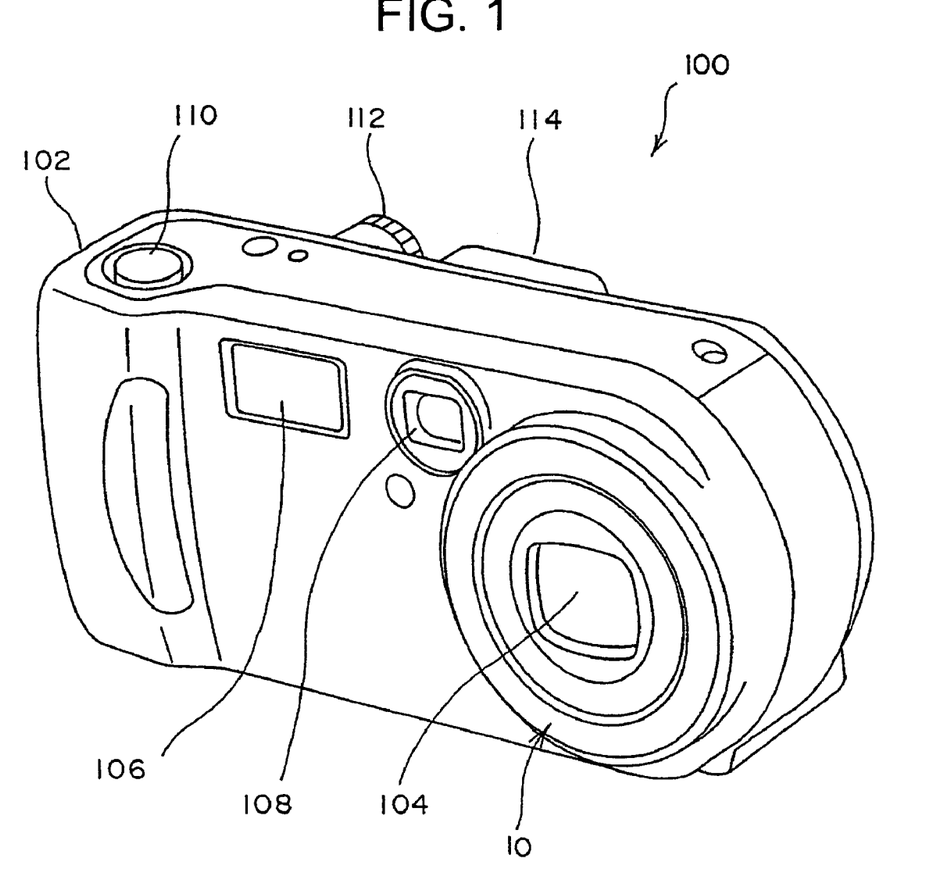
FIG. 1 is a perspective view of an imaging apparatus as an example of preferred embodiment of the present invention.
Figure 2:
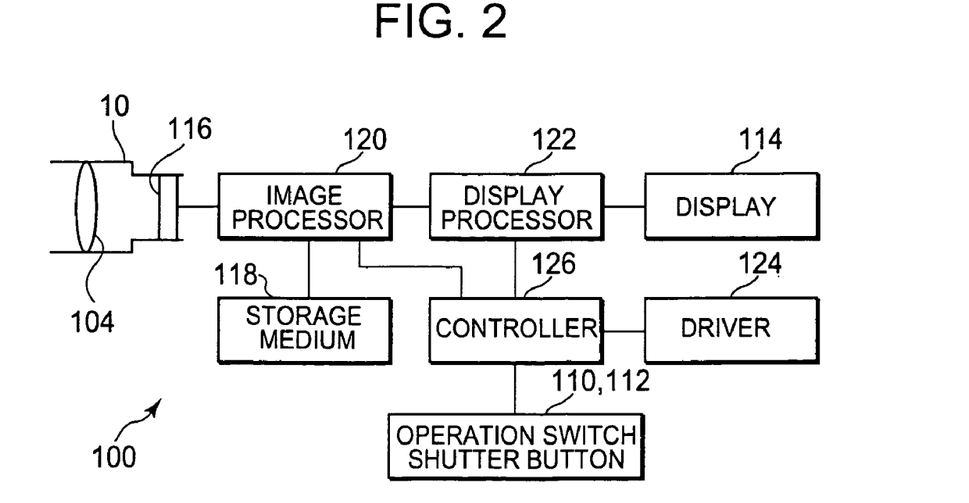
FIG. 2 is a block view illustrating the configuration of the imaging apparatus as an example of preferred embodiment of the present invention.

FIG. 1 is a perspective view of an imaging apparatus according to the example of preferred embodiment of the present invention. FIG. 2 is a block view illustrating the configuration of the imaging apparatus according to the example of preferred embodiment of the present invention.

As shown in FIG. 1, the imaging apparatus 100, which constitutes this example of preferred embodiment, is a digital still camera having a case 102, which constitutes an outer cover or body thereof.

A collapsible lens barrel 10 for accommodating and holding an image-capturing optical system 104 is provided at a location to the right side of the front face of the case 102. A flash section 106 and an objective lens 108 of an optical finder 40 are provided at a place to the top of the front face of the case 102 (see FIG. 5).

The lens barrel 10 is configured in such a way as to be moved by a drive section 124 (see FIG. 2), which is incorporated in the case 102, between a use position (corresponding to a wide-angle condition, a telescopic condition, and an intermediate condition between the wide-angle condition and the telescopic condition) projecting forwardly from the front face of the case 102 and an accommodation position (corresponding to a collapsed condition), at which the lens barrel 10 is accommodated in the front face of the case 102.

A shutter button 110 is provided on the top face of the case 102. An eyepiece window (not shown) of the optical finder, plural operation switches 112 for performing various operations, such as the on/off of a power supply, and the changeover among an image-capturing mode and a reproducing mode, and a display 114 (see FIG. 2) for displaying a photographed image are provided on the rear face of the case 102.

As shown in FIG. 2, an imaging device 116, which is constituted by a CCD and a CMOS sensor, for electronically imaging an object, whose optical image is formed by the image-capturing optical system 104, is disposed in the rear portion of the lens barrel 10. The imaging apparatus 100 has an image processor 120 for generating image data according to imaging signals outputted from the imaging device 116 and for recording the image data in a storage medium 118, and also has a display processor 122 for displaying the image data in a display 114, a driver 124, and a controller 126 that includes a CPU for controlling the image processor 120, the display processor 122 and a driver 124 in response to operations performed on the operating switch 112 and the shutter button 110.

Next, the outline of the configuration of the lens barrel 10 is described hereinbelow.

Figure 3A:
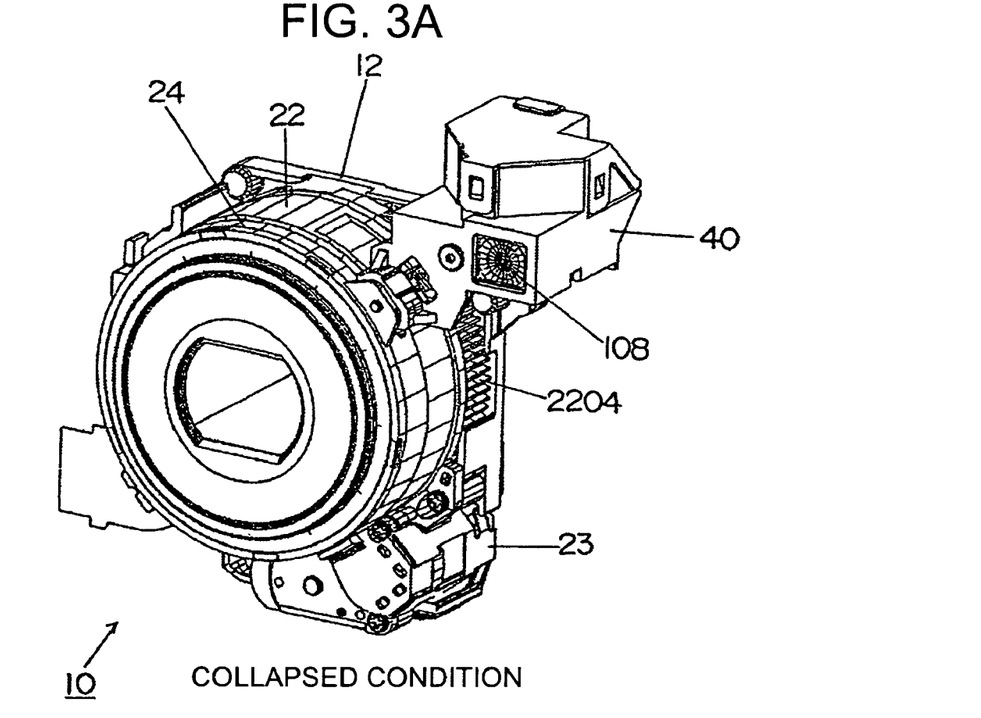
FIGS. 3(A) and 3(B) are perspective views illustrating the conditions of a lens barrel 10.
Figure 3B:
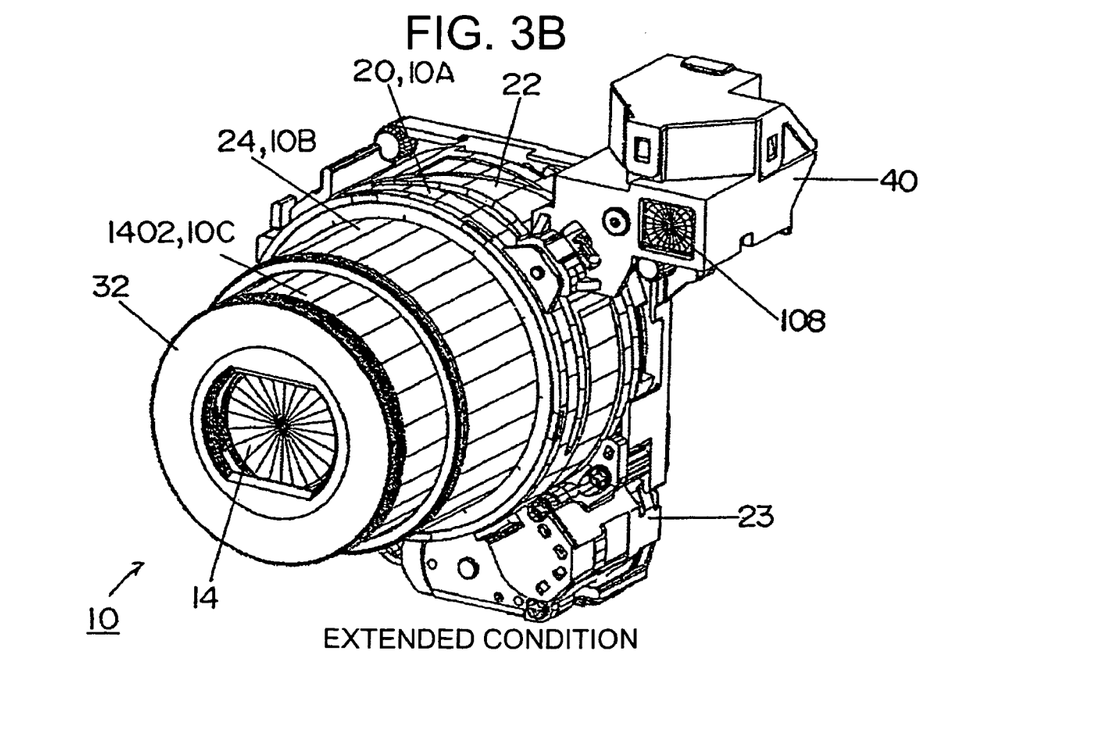
Figure 4A:
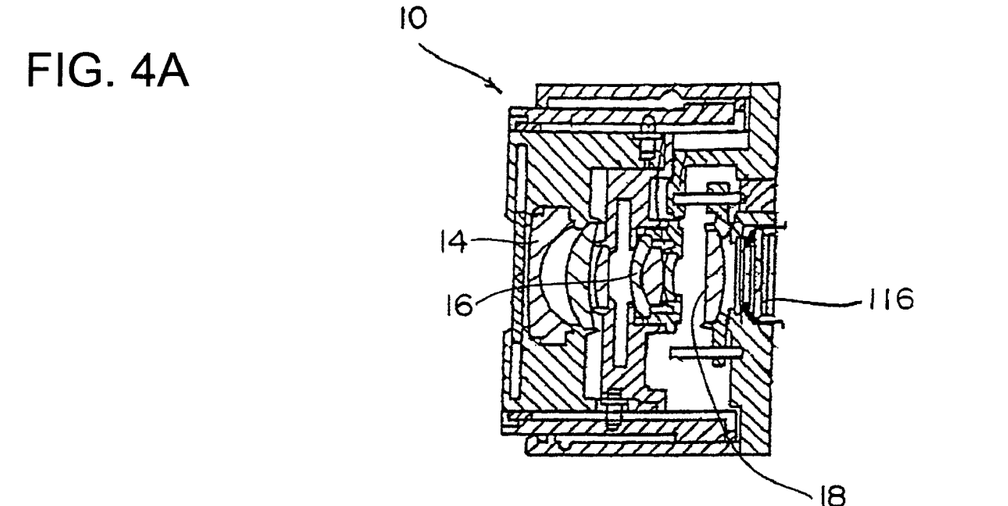
FIGS. 4(A) to 4(C) are cross-sectional views illustrating the conditions of the lens barrel 10.
Figure 4B:
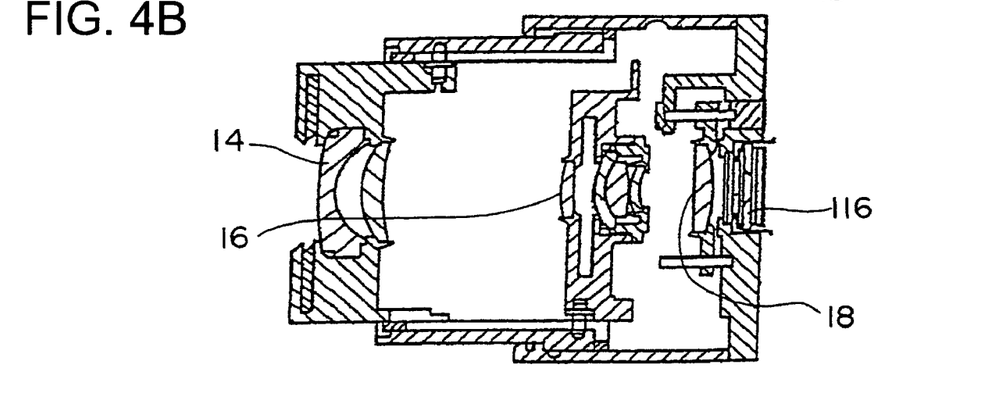
Figure 4C:
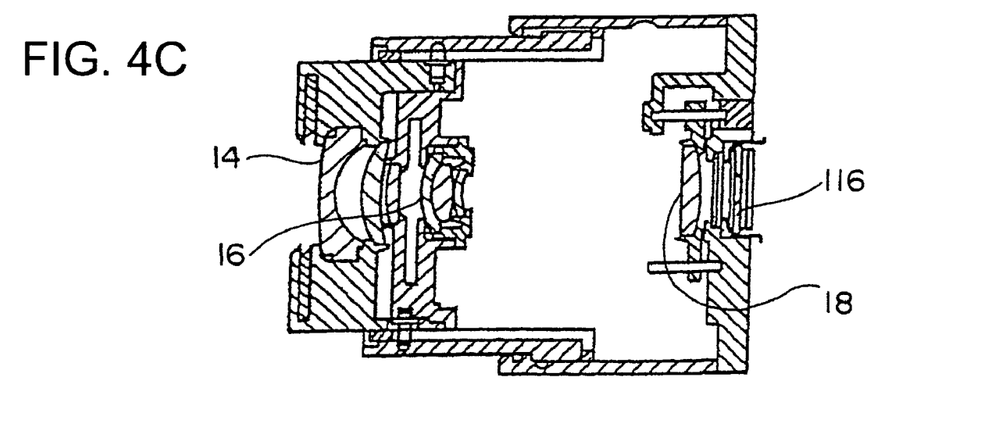
Figure 5:
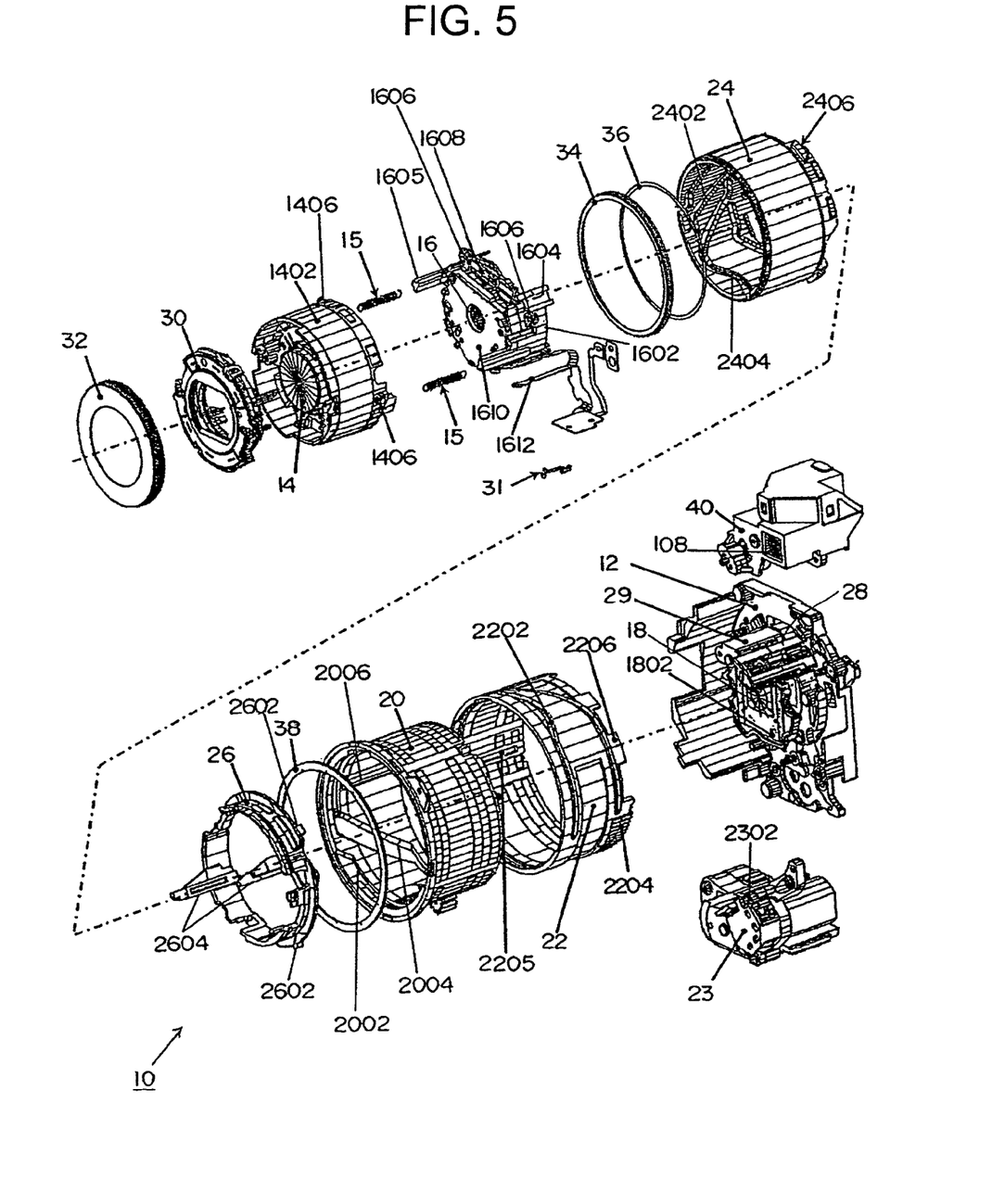
FIG. 5 is an exploded perspective view illustrating a collapsible lens.

FIGS. 3(A) and 3(B) are perspective views each illustrating the condition of the lens barrel. FIG. 3(A) shows a lens accommodated condition, that is, a collapsed condition in which the lens is unused. FIG. 3(B) shows a lens projected condition (in other words, the wide-angle condition or the telescopic condition) in which the lens is used. FIGS. 4(A) to 4(C) are cross-sectional views of the lens barrel 10. FIG. 4(A) shows the collapsed condition thereof. FIG. 4(B) shows the wide-angle condition thereof. FIG. 4(C) shows the telescopic condition thereof. FIG. 5 is an exploded perspective view illustrating the lens barrel 10.

As shown in FIGS. 3(A) and 3(B), the lens barrel 10 is attached to a base 12 that is fixed to the case 102.

As shown in FIGS. 4(A) to 4(C), the lens barrel 10 optically has a three-group configuration. In other words, assuming that an object side in the direction of an optical axis of the lens barrel 10 is a front side, and that the side of the imaging device 116 in the direction of an optical axis thereof is a rear side, three groups constituting the lens barrel 10 include a first group lens 14, a second group lens 16, and a third group lens 18 disposed in this order from the front side to the rear side.

The first group lens 14 and the second group lens 16 of the lens barrel 10 are driven in the direction of the optical axis thereof along a predetermined cam curve to thereby perform zooming. The third group lens 18 of the lens barrel 10 is minutely displaced in the direction of the optical axis thereof to thereby perform focusing. In other words, the lens barrel is configured so that the displacement of each of the first group lens 14 and the second group lens 16 enables the change of a focal length, and that a deviation of a focusing position, which is caused by this change of the focal length, is corrected by the displacement of the third group lens 18 to thereby suitably achieve focusing.

As shown in FIG. 5, in the lens barrel 10, a fixed ring 20, a rotative ring 22, a cam ring 24 (corresponding to the first lens barrel described in the claims), and a rectilinear guide ring 26 are used as constituents for moving the first group lens 14 and the second group lens 16 in the direction of the optical axis thereof. A male screw member and a female screw member are used as constituents for moving the third group lens 18 in the direction of the optical axis thereof.

This example of preferred embodiment of the present invention is provided with a barrier mechanism 30 for opening and closing an optical path of the image-capturing optical system at the front portion of the first group lens 14.

Figure 6:
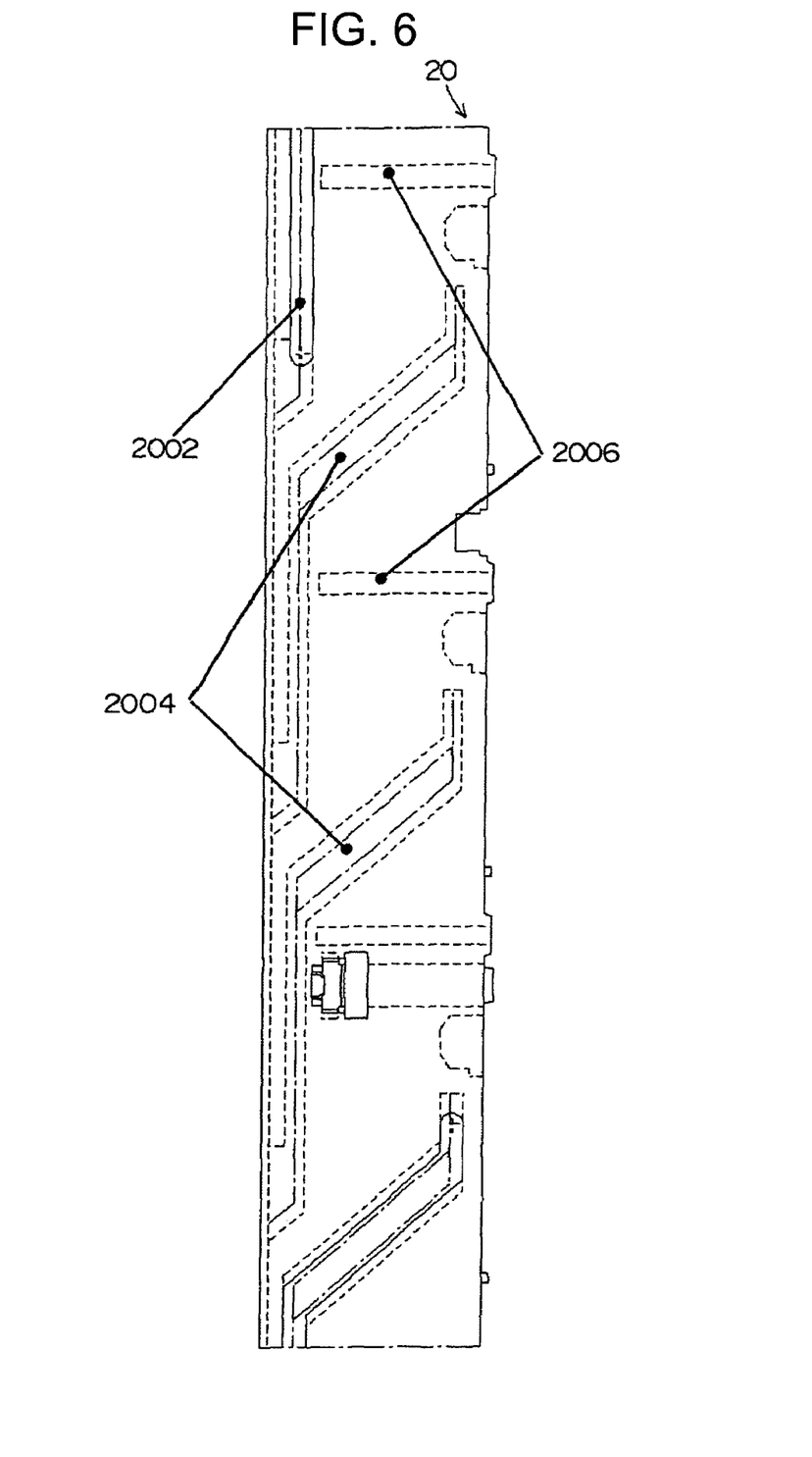
FIG. 6 is a development view of a fixed ring 20.

More specifically, the fixed ring 20 is fixed to the base 12. As shown in FIG. 6, cam grooves 2002 and 2004, which circumferentially extend, and a rectilinear guide groove 2006 extending in parallel with the direction of the optical axis of the image-capturing optical system are provided in an inner peripheral surface of the fixed ring 20.

The rotative ring 22 is rotatably provided on an outer periphery of the fixed ring 20 in such a way as to be unable to move in the direction of the optical axis.

Plural cam grooves 2202 penetrating the inner peripheral surface and the outer peripheral surface of the rotative ring 22 and extending in the direction of the circumference thereof are provided therein. A rectilinear groove 2205 rectilinearly extending along the direction of the optical axis is provided in the inner peripheral surface of the rotative ring 22. A gear section 2204 is formed in a rear portion of the outer peripheral surface of the rotative ring 22 in such a way as to have a predetermined length in the circumferential direction thereof. Plural fins 2206 for detecting a rotational position are provided on the rear end of the rotative ring 22 in such a manner as to project therefrom.

A gear section 2204 is meshed with a gear 2302 of a rotative ring drive mechanism 23 attached to the base 12. A rotation driving force fed from the rotative ring drive mechanism 232 is supplied to the rotative ring 22 through a gear 2302 and a gear section 2204, so that the rotative ring 22 is driven in such a way as to rotate around the optical axis thereof.

The rotative ring drive mechanism 23 has a DC motor for rotation-driving the gear 2302, a rotary encoder for counting the number of revolutions of this DC motor or the gear 2302, and a photo sensor for detecting the movement of the fins 2206. The rotational speed and the rotational position of the rotative ring 22 are controlled according to detection signals of the rotary encoder and the photo sensor.

The third group lens 18 is held by a third group lens frame 1802 that is disposed on the base 12 and held by a guide mechanism 28 in such a way as to move in the direction of the optical axis thereof and as to be unable to rotate around the optical axis thereof. The third group lens frame 1802 is configured in such a way as to be minutely displaced in the direction of the optical axis by a drive mechanism 29.

Figure 7:
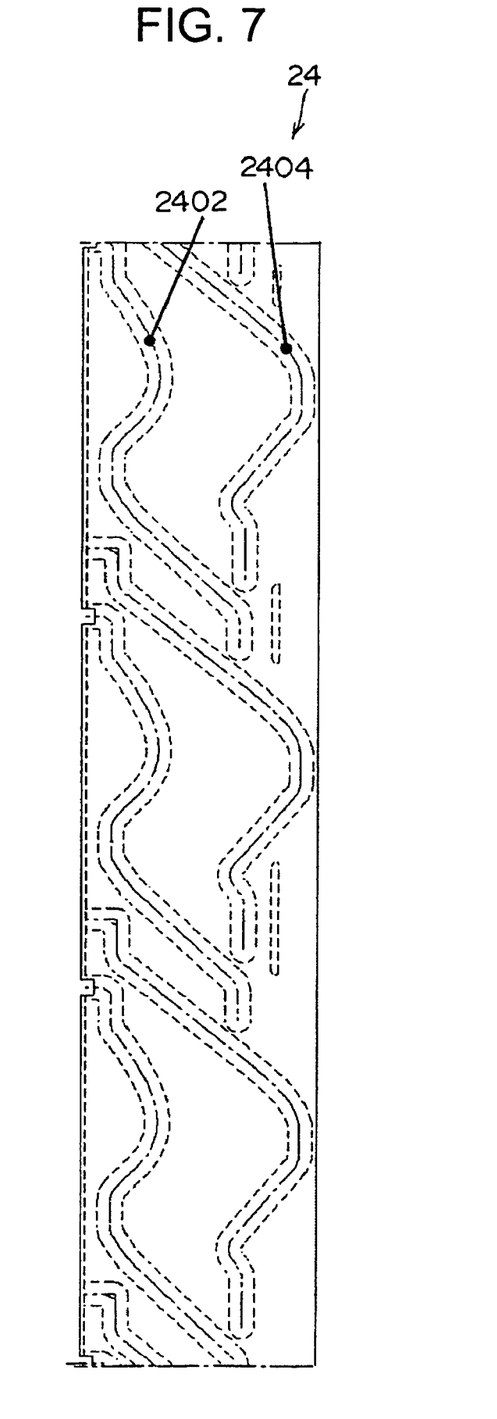
FIG. 7 is a development view of a cam ring 24.

A cam ring 24 is provided in the radially inner portion of the fixed ring 20 in such a way as to rotate and move in the direction of the optical axis thereof. Cam grooves 2402 and 2404 are provided in the inner peripheral surface of the cam ring 24, as shown in FIG. 7. Three protruding sections 2406 projecting radially and outwardly are provided on the rear end of the cam ring 24 in such a way as to be spaced in the circumferential direction thereof, as shown in FIG. 5. Further, during a state in which these three protruding sections 2406 engage with the cam grooves 2002 and 2004 of the fixed ring 20, the cam ring 24 performs rotational motions with respect to the fixed ring 20, so that these three protruding sections 2406 are moved along the cam grooves 2002 and 2004. Consequently, the cam ring 24 is moved in the direction of the optical axis thereof.

Furthermore, at least one of the cam grooves 2002 of the fixed ring 20 penetrates therethrough. An end of an arm (not shown) provided on the protruding portion 2406 of the cam ring 24, which corresponds to the cam groove 2002 penetrating therethrough, engages with the rectilinear groove 2205 of the rotative ring 22 through the cam grooves 2002. Consequently, the cam ring 24 and the rotative ring 22 are connected to each other and rotate with respect to the fixed ring 20. In other words, when the rotative ring 22 is rotated, the cam ring 24 moves in the direction of the optical axis while rotating.

The rectilinear guide ring 26 is provided in the radially inner portion of the cam ring 24 in such a manner as to be unable to rotate and as to move in the direction of the optical axis by being connected to the cam ring 24. Particularly, three protruding sections 2602 projecting radially and outwardly are provided on the rear end of the rectilinear guide ring 26 are provided by being spaced in the circumferential direction. Further, in a state in which these three protruding sections 2602 extend through the rear of the cam ring 24 and engage with the rectilinear guide grooves 2008 of the fixed ring 20, the cam ring 24 performs rotational motions with respect to the fixed ring 20. Thus, these three protruding sections 2602 are moved along the rectilinear guide groove 2006 of the fixed ring 20. Consequently, the guide ring 26 are linked with the cam ring 24 and moved only in the direction of the optical axis without rotating.

Further, guide pieces 2604 are provided on the rectilinear guide ring 26 in such a way as to be respectively projected forwardly from two places located across a radial direction of the front edge thereof in parallel to the direction of the optical axis.

The second group lens 16 is held by the second group lens frame 1602. The second group lens 16 is disposed on the inner periphery of the cam ring 24. Guide sections 16 positioned at two places, which are located across a radial direction, in such a way as to extend in parallel to the direction of the optical axis and as to be guided by two guide pieces 2604 of the rectilinear guide ring 26, guide rails 1605 positioned at two places, which are located across a radial direction, in such a manner as to extend in parallel to the direction of the optical axis and as to forwardly project, and three cam pins 1606 engaged with the cam grooves 2404 of the cam ring 24 are provided on the outer peripheral surface of the second group lens frame 1602.

Further, in a state in which the guide sections 1604 are guided by the guide pieces 2604 and in which the three cam pins 1606 are engaged with the cam grooves 2404 of the cam ring 24, the cam ring 24 rotates, so that the second group lens 16 is moved along the cam curves set in the cam grooves 2404 only in the direction of the optical axis without rotating.

The second group lens frame 1602 is provided with a second group light shielding plate 1608 for shielding stray light in the lens barrel 10 and for preventing stray light from entering the imaging device 116.

The second group light shielding plate 1608 is attached to the second group lens frame 1602 in such a way as to swing around an axis line extending in a direction parallel to a plane perpendicular to the optical axis.

In a condition in which the lens barrel 10 is projected, the second group light shielding plate 1608 is placed at a shielding position for shielding light, by being pushed by a pushing member (not shown) in such a way as to abut against a stopper (not shown) provided on the second group lens frame 1602. In a process in which the condition of the lens barrel 10 is changed from the projected condition to the accommodated condition, the second group light shielding plate 1608 is made to abut against the front portion of the third group lens moving mechanism 28. Thus, the second group light shielding plate 1608 is swung from the shielding position and retreated from the front portion of the third group lens moving mechanism 28. Consequently, the second group light shielding plate 1608 and the second group lens frame 1602 can be placed nearer to the vicinity of the base 12. This is advantageous in reducing the space in the direction of the optical axis, which is occupied by the second group lens frame 1602, in the accommodated condition of the lens barrel 10.

Further, an automatic exposure device 1610 and a flexible substrate 1612 (to be described later) are provided on the second group lens frame 1602.

The first group lens 14 is held by the first group lens frame 1402 (corresponding to the second lens barrel described in the claim). The first group lens frame 1402 is disposed in the inner periphery of the cam ring 24 and in front of the second group lens frame 1602. The inner peripheral surface of the first group lens frame 1602 is provided with guide grooves (not shown) formed in two places, which are located across a radial direction, in such a way as to extend in parallel to the direction of the optical axis and as to be guided by two guide rails 1605 of the second group lens frame 1602, and with three cam pins 1406 engaged with the cam grooves 2404 of the cam rig 24.

Further, in a state in which the guide grooves are guided by the guide rails 1605 and in which the three cam pins 1406 are engaged with the cam grooves 2402 of the cam ring 24, the cam ring 24 rotates, so that the first group lens 14 is moved only in the direction of the optical axis along the cam curve set in the cam groove 2402 without rotating.

Furthermore, a metallic accessory plate 32 for arranging the appearance of the lens barrel 10 is attached to the front portion of the first group lens frame 14. A metallic accessory ring 34 for arranging the appearance of the lens barrel is attached to the front portion of the cam ring 24.

A light shielding ring 36 for preventing dust and stray light from entering the gap between the outer periphery of the first group lens frame 14 and the inner periphery of the cam ring 24 is disposed in the gap therebetween. This light shielding ring 36 is attached onto the first group lens frame 14 and disposed in a state in which a clearance is provided between the decorative ring 34 and the cam ring 24.

A light shielding ring 38 for preventing dust and stray light from entering the gap between the outer periphery of cam ring 24 and the inner periphery of the fixed ring 20 is disposed in the gap therebetween. This light shielding ring 38 is attached to the outer periphery of the cam 24 and brought into elastic contact with the inner periphery of the fixed ring 20.

Further, the optical finder 40 incorporates a movable lens and is attached to the base 12. The movable lens is connected to the cam groove 2202 of the rotative ring 22 through a cam pin (not shown). The movable lens moves in conjunction with the rotative ring 22 in the direction of the optical axis, so that an operation of zooming the visual field is performed.

Next, the automatic exposure device 1610 and the flexible substrate 1612 are described hereinbelow in detail.

Figure 8:
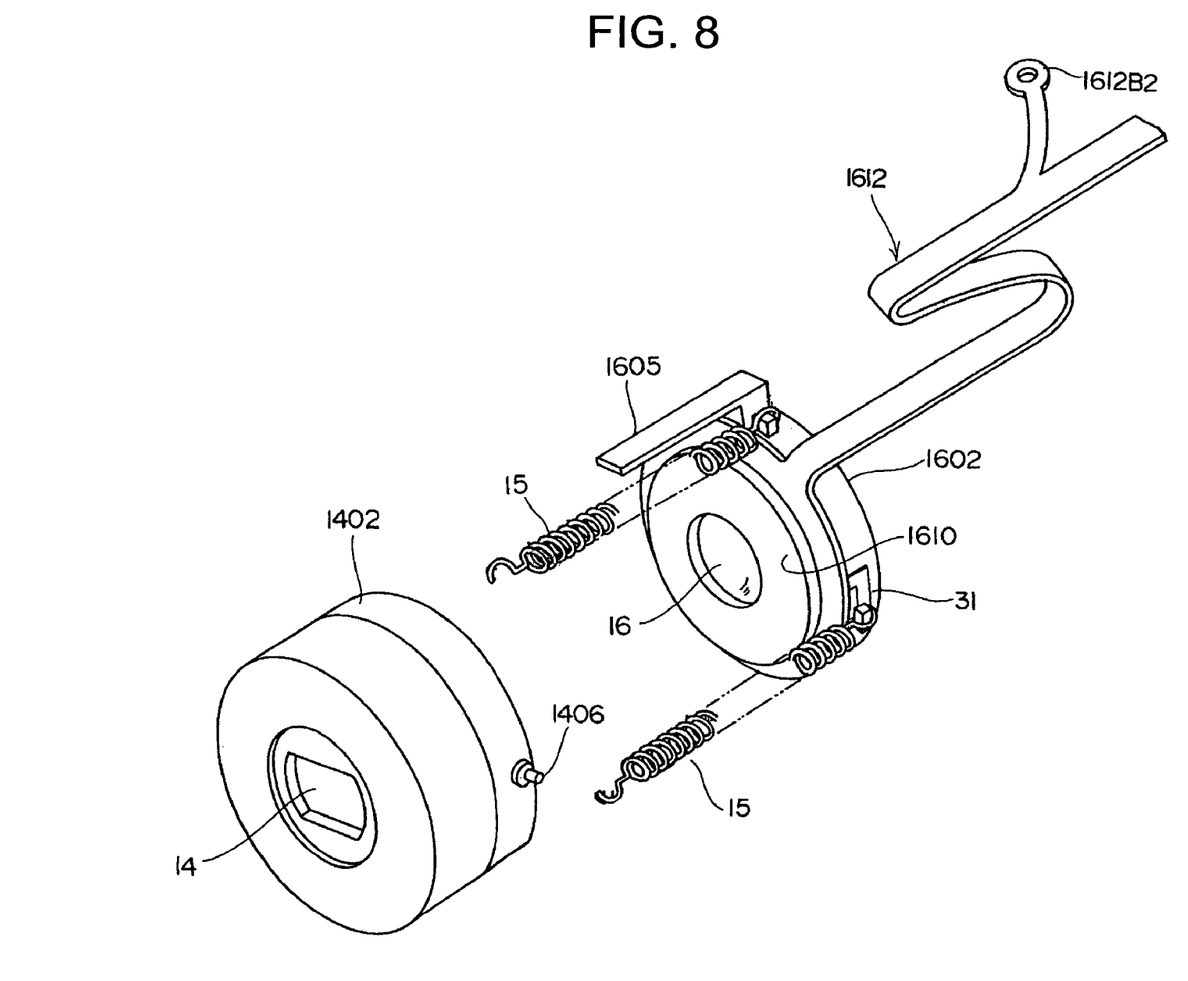
FIG. 8 is a perspective view illustrating the schematic configuration of each of a first group lens frame 1402 and a second group lens frame 1602.
Figure 9:
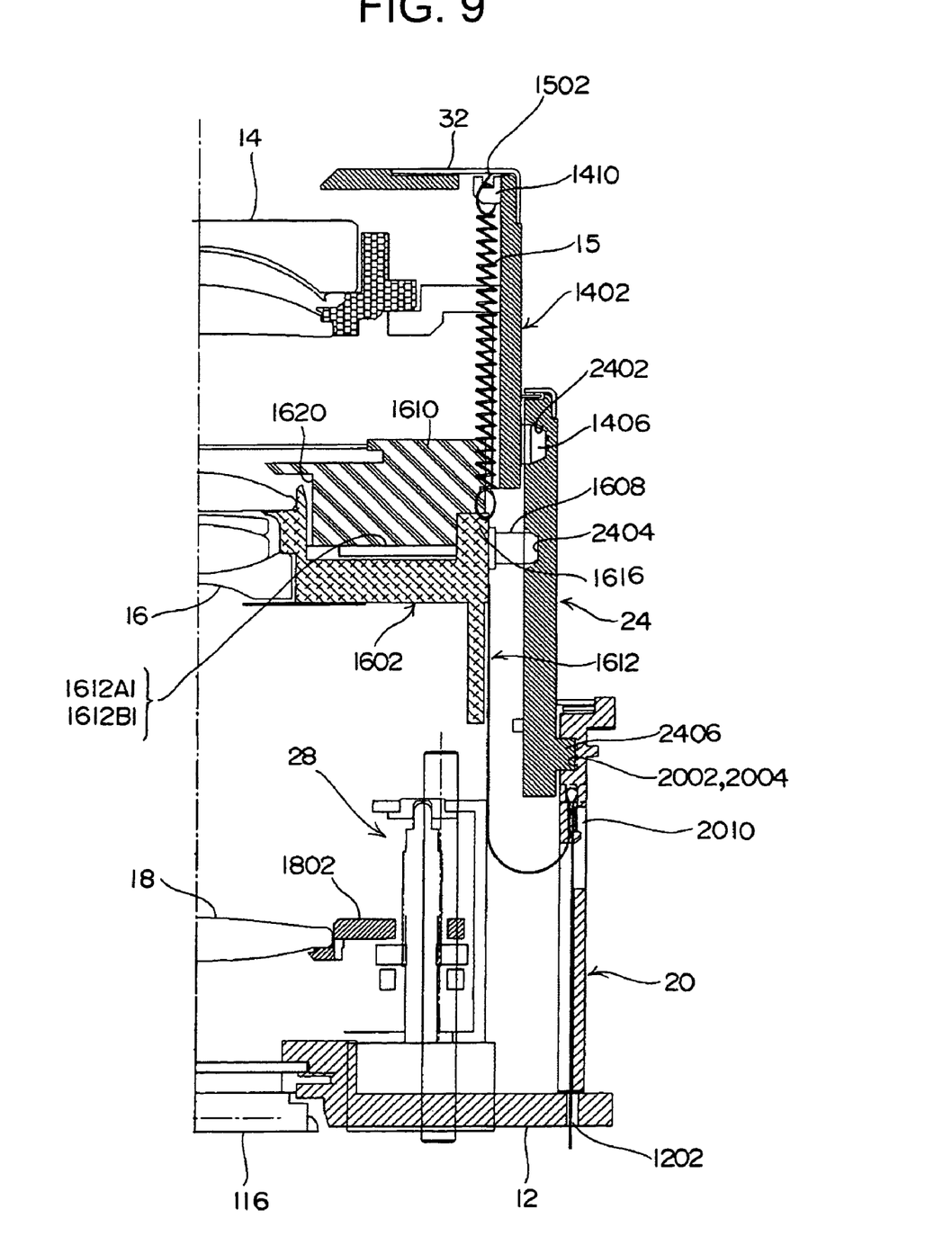
FIG. 9 is a longitudinally cross-sectional view of a lens barrel 10.
Figure 10:
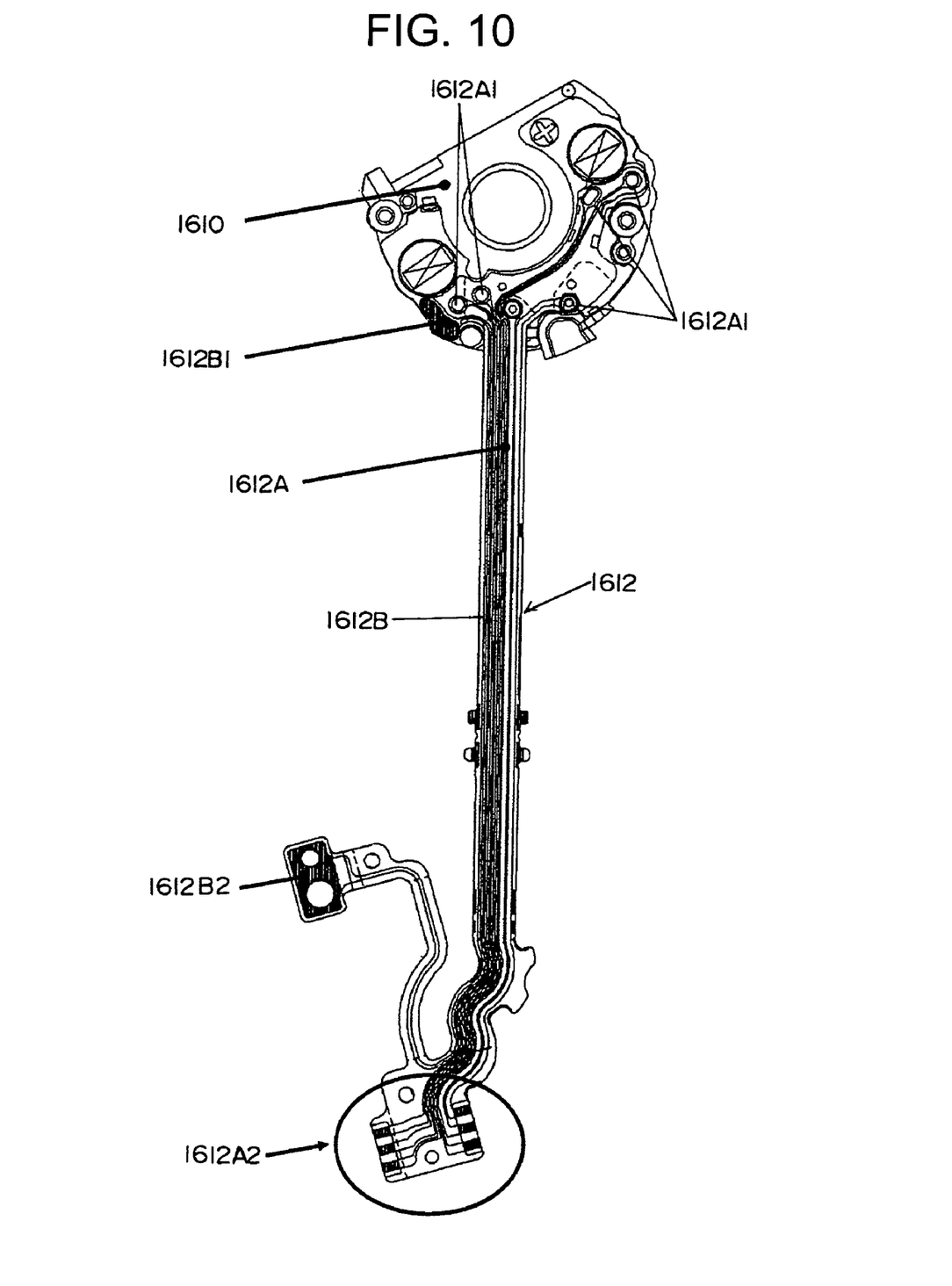
FIG. 10 is an explanatory view of each of an automatic exposure apparatus 1610 and a flexible substrate 1612.

FIG. 8 is a perspective view illustrating the schematic configuration of each of the first group lens frame 1402 and the second group lens frame 1602. FIG. 9 is a longitudinally cross-sectional view of a lens barrel 10. FIG. 10 is an explanatory view of each of the automatic exposure apparatus 1610 and the flexible substrate 1612. Incidentally, FIG. 8 is drawn by simplifying the shape of each of portions thereof for convenience of drawing.

As shown in FIGS. 8 and 9, the automatic exposure device 1610 has a case 1620, which is attached to the front portion of the second group lens frame 1602. A shutter mechanism for opening and closing an optical path of the image-capturing optical system 104, and a light intensity adjusting mechanism for adjusting the intensity of light in the optical path of the image-capturing optical system 104 are disposed in the case 1620. The automatic exposure device 1610 includes the shutter mechanism and the light intensity adjusting mechanism.

In this example of preferred embodiment of the present invention, the shutter mechanism constitutes the operational unit described in the claims, and also the light intensity adjusting mechanism constitutes the operational unit described in the claims.

The shutter mechanism and the light intensity adjusting mechanism are configured in such a way as to operate according to control signals supplied from an electric circuit 130 (see FIG. 11), which is incorporated into the case 102 of the imaging apparatus 100, through the flexible substrate 1612. Various mechanisms, which have hitherto and publicly been known, for example, the combination of an electrical actuator, such as a motor, and a mechanical opening/closing mechanism, and a device employing as a liquid crystal device as the light intensity adjusting mechanism, can be employed as the shutter mechanism and the light intensity adjusting mechanism.

The flexible substrate 1612 is constituted by a flexible material. As shown in FIG. 9, end sides 1612A1 and 1612B1 of the flexible substrate 1612 are attached to the case 1620 of the automatic exposure device 1610 by adhesive bonding. An intermediate section of the flexible substrate 1612 is configured so that a bent portion thereof extends through the rear of the cam ring 24 and is held by an attaching section 2010 of the fixed ring 20, and that the other ends 1612A2 and 1612B2 thereof extend along the fixed ring 20 and are led to the rear from the opening 1202 of the base 12.

Further, the flexible substrate 1612 is formed in such a manner as to follow a rotational operation of the rotative ring 22 and the movement in the direction of the optical axis of each of the second group lens frame 1602 and the rectilinear guide ring 26, as to move while the bent portion continuously changes, and as not to strain the first interconnect section 1612A and the second interconnect section 1612B.

More particularly, as shown in FIG. 10, the flexible substrate 1612 has a first interconnect section 1612A and a second interconnect section 1612B. In this example of preferred embodiment of the present invention, the first interconnect section 1612A and the second interconnect section 1612B are formed on a single substrate.

In this example of preferred embodiment of the present invention, the first interconnect section 1612A has plural conducting lines, one end 1612A1 of each of which is electrically connected to a corresponding one of plural connecting ends of the automatic exposure device 1612, and the other end 1612B2 of each of which is electrically connected to a place provided outside the lens barrel 10 and in the case 102 in such a way as to have ground potential. In this example of preferred embodiment of the present invention, one end 1612B of the second interconnect section 1612B is formed as a pattern section formed in such a way as to have a predetermined area and as to be exposed so that the surface of the second interconnect section 1612B is electrically connectable.

As shown in FIGS. 8 and 9, two metallic coil springs 15 are provided in a stretched condition between the first group lens frame 1402 and the second group lens frame 1602.

The two coil springs 15 extend in parallel to the optical axis in a front-rear direction between the first lens frame 1402 and the second group lens frame 1602 in the first group lens frame 1402 and the cam ring 24 and also push the first group lens frame 1402 and the second group lens frame 1602 in a direction in which the first group lens frame 1402 and the second group lens frame 1602 come close to each other. Therefore, the two coil springs 15 forwardly push the second group lens frame 1602. More specifically, both of each of the coil springs 15 are respectively caught in a spring catching section 1410, which is provided to the front end in the first group lens frame 1402 in such a way as to project therefrom, and in a spring catching section 1616 provided to the front end and the outer periphery of the second group lens frame 1602.

The backlash between the cam pin 1406 and the cam groove 2402 and that between the cam pin 1606 and the cam groove 2404 are absorbed by the pushing force of the coil springs 15.

In this example of preferred embodiment of the present invention, a front end 1502 of one of the two coil springs 15 is brought into elastic contact with the rear surface of the accessory plate 32. Thus, the accessory plate 32 is electrically conducted to the one of the coil springs 15.

Further, the rear end of the one of the coil springs 15 is electrically connected to the one end 1612B1 of the second interconnect section 1612B of the flexible substrate 1612.

Specifically, in this example of preferred embodiment of the present invention, a conducting plate 31 constituted by an electrically conducting material, such as metal, is provided to the rear end of the outer peripheral surface of the second group lens frame 1602, as shown in FIGS. 5 and 8. The above-mentioned spring catching section 1616 is formed integrally with this conducting plate 31. Thus, the one of the coil springs 15 is electrically connected to the conducting plate 31.

Furthermore, the conducting plate 31 is electrically connected to the one end 1612B1 of the second interconnect section 1612B of the flexible wiring plate 1612.

Therefore, the accessory plate 32 is electrically connected to the grounded place in the case 102 through a path including the coil springs 15, the conducting plate 31, and the second interconnect section 1612B.

Next, a description is given of a case where electrostatic discharge or charge occurs on the lens barrel 10 of the imaging apparatus 100 according to this example of preferred embodiment of the present invention.

Figure 11:
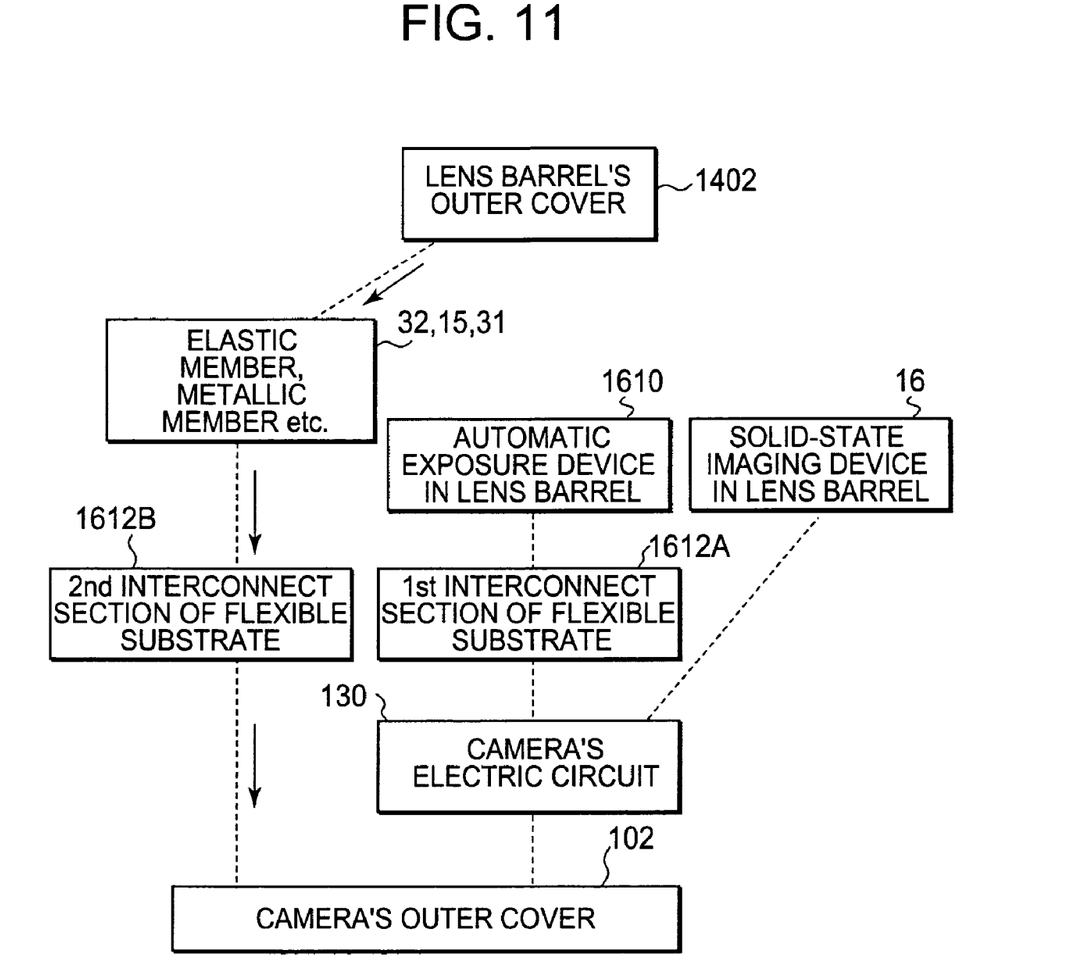
FIG. 11 is an explanatory view illustrating electrical connection in an imaging apparatus 100.

FIG. 11 is an explanatory view illustrating electrical connection in an imaging apparatus 100. In the figure, dashed lines represent electrically conducted paths. Solid arrows designate flows of electric currents generated by electrostatic discharge and charge.

As illustrated in FIG. 11, in the automatic exposure device 1612, the shutter mechanism and the light intensity adjusting mechanism are operated by supplying the control signals thereto from the electric circuit 130 through the first interconnect section 1612.

Further, as illustrated in FIGS. 9 and 11, during the lens barrel 10 is in the projected condition, when discharge or charge occurs on an end of the lens barrel 10, that is, the accessory plate 32 or the vicinity thereof, so that electric current flows therein, this current is led to the grounded place of the case 102 through a path comprising the accessory plate 32, the coil springs 15, the conducting plate 31, and the second interconnect section 1612B.

Consequently, the current does not flow in the electric circuit 130 and the imaging device 1616. Thus, operations of the electric circuit 130 and the imaging device 1616, or electronic components constituting the electric circuit 130 and the imaging device 1616 are surely prevented from being adversely affected.

Also, even in a case where the gap between the lens barrel 10 and the flexible substrate 1612 is narrow, electrostatic current can surely be led to the grounded place in the case 102, so that the adverse effects can surely be affected. Thus, this example of preferred embodiment of the present invention is advantageous in miniaturization of the lens barrel 10 and the imaging apparatus 100.

Additionally, in this example of preferred embodiment of the present invention, the coil springs 15 disposed in the lens barrel 10 are conducted to the grounded place in the case 102. Thus, electric current due to static electricity generated on the lens barrel 10 is led to the coil springs 15 at ground level midway through the path assumed to extend from the front portion of the lens barrel 10 to the rear portion thereof. Consequently, this example of preferred embodiment of the present invention is advantageous in surely preventing the current from being transmitted to the imaging device 116 attached to the rear portion of the lens barrel 10.

Figure 12:
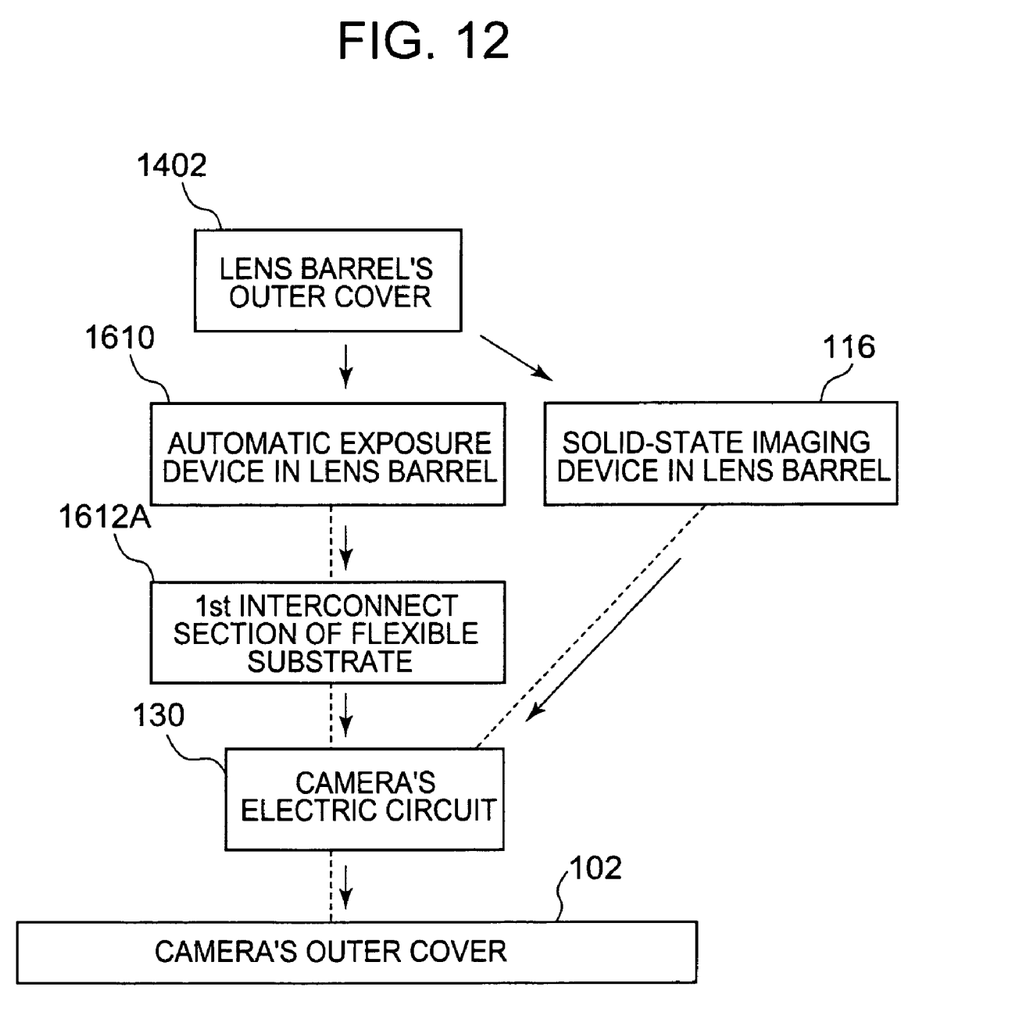
FIG. 12 is an explanatory view illustrating electrical connection in the imaging apparatus 100 that is not provided with a second interconnect section 1612B on the flexible substrate 1612.

FIG. 12 illustrates a comparative example and constitutes an explanatory view showing electrical connection in the imaging apparatus 100 that is not provided with the second interconnect section 1612B on the flexible substrate 1612.

In this case, the electrostatic current generated in the lens barrel 10 is transmitted therethrough and flows into the imaging device 116 and into the electric circuit 130 hrough the first interconnect section 1612A. This may adversely affect operations of the electric circuit 130 and the imaging device 1616, or affect the electronic components constituting the electric circuit 130 and the imaging device 1616.

In addition, in this example of preferred embodiment of the present invention, the metallic accessory plate 32 is attached to the front portion of the first group lens frame 1505. Also, the front ends of the coil springs 15 are electrically connected to the accessory plate 32. However, needless to say, even in a case where the front ends of the coil springs 15 are disposed close to the accessory plate 32, electrostatic current can be led to the coil springs 15 from the front ends thereof. Incidentally, in a case where the electrical connection of the front ends of the coil sprints 15 to the accessory plate 32 is established, similarly to the embodiment, this is more advantageous in surely leading the electrostatic current to the coil springs 15.

Further, although the description of this example of preferred embodiment of the present invention has described the case where the metallic accessory plate 32 is attached to the front portion of the first group lens frame 1404, needless to say, present invention can be applied to a lens barrel provided with no metallic accessory plate 32.

Moreover, although the description of this example of preferred embodiment of the present invention has described the shutter mechanism and the light intensity adjusting mechanism as examples of the operational unit for performing operations relating to image-capturing, the operational unit is not limited to the shutter mechanism and the light intensity adjusting mechanism, because the constitution of the operational unit is determined according to various operations needed for realizing the functions of the imaging apparatus.

By the way, although the description of this example of preferred embodiment of the present invention has described the digital still camera employed as the imaging apparatus, the present invention can be applied to various kinds of the imaging apparatus, such as a video camera. Therefore, it is to be understood that the present invention is not limited to the embodiments described above. It will be obvious to those of ordinary skill in the art that various changes, modifications, combinations, sub combinations, alterations and the like may be made depending on design requirements and other factors insofar as they are within the scope of the appended claims and equivalents thereof.

What is claimed is:

1. A lens barrel including a base and a collapsible barrel provided so as to collapse into and expand out of the base, the barrel including a lens constituting an image-capturing optical system for introducing an image of an object, a lens frame for holding the lens, and an operational unit provided in the lens frame for performing an operation relating to image capture based on a control signal supplied thereto, the lens barrel comprising:

a flexible substrate provided within the lens barrel for supplying the control signal from an electric circuit provided outside the barrel to the operational unit;

wherein the flexible substrate comprises:
a first interconnect section to which the control signal is supplied; and
a second interconnect section provided separately from the first interconnect section and having an end connected onto the lens frame and another end electrically connected to a ground potential, wherein:
the barrel comprises a first barrel adapted to collapse into and expand out of the base, and a second barrel adapted to collapse into and expand out of the first barrel; wherein
the lens frame is movably disposed within the first barrel in a direction of an optical axis;
a metallic coil spring is provided extending in a rear-front direction between an end of the second barrel and the lens frame within the first barrel and the second barrel, and forwardly pushing the lens frame; and
a rear end of the coil spring is electrically connected to the second interconnect section.

2. The lens barrel according to claim 1, wherein the lens frame is movably disposed in a direction of an optical axis of the image-capturing optical system.

3. The lens barrel according to claim 1, wherein:
the lens frame is provided with a light intensity adjusting mechanism for adjusting a intensity of light in an optical path of the image-capturing optical system; and
the operational unit includes the light intensity adjusting mechanism.

4. The lens barrel according to claim 1, wherein:
the lens frame is provided with a shutter mechanism for opening and closing an optical path of the image-capturing optical system; and
the operational unit includes the shutter mechanism.

5. A lens barrel including a base and a collapsible barrel provided so as to collapse into and expand out of the base, the barrel including a lens constituting an image-capturing optical system for introducing an image of an object, a lens frame for holding the lens, and an operational unit provided in the lens frame for performing an operation relating to image capture based on a control signal supplied thereto, the lens barrel comprising:
a flexible substrate provided within the lens barrel for supplying the control signal from an electric circuit provided outside the barrel to the operational unit;
wherein the flexible substrate comprises:
a first interconnect section to which the control signal is supplied; and
a second interconnect section provided separately from the first interconnect section and having an end connected onto the lens frame and another end electrically connected to a ground potential, wherein:
the barrel comprises a first sub-barrel adapted to collapse into and expand out of the base, and a second sub-barrel adapted to collapse into and expand out of the first sub-barrel;
a metallic accessory plate provided attached to an end of the second sub-barrel and having with an opening in the center constituting an optical path of the image-capturing optical system;
the lens frame is movably provided within the first sub-barrel in a direction of an optical axis;
a metallic coil spring is provided extending in a rear-front direction between an end of the second barrel and the lens frame within the first barrel and the second barrel, and forwardly pushing the lens frame; and
a rear end of the coil spring is electrically connected to the second interconnect section.

6. The lens barrel according to claim 5, wherein a front end of the coil spring is brought into elastic contact with the accessory plate.

7. An imaging apparatus including a base, and a collapsible barrel provided to collapse into and expand out of the base, the barrel including a lens constituting an image-capturing optical system for introducing an optical image of an object; an imaging device for imaging the object; a lens frame for holding the lens; and an operational unit provided in the lens frame for performing an operation relating to image capture based on a control signal supplied thereto, the imaging apparatus comprising:
a flexible substrate provided within the lens barrel for supplying the control signal from an electric circuit provided outside the barrel to the operational unit;
wherein the flexible substrate comprises:
a first interconnect section to which the control signal is supplied; and
a second interconnect section provided separately from the first interconnect section and having an end connected onto the lens frame and another end electrically connected to a ground potential, wherein:
the barrel comprises a first barrel adapted to collapse into and expand out of the base, and a second barrel adapted to collapse into and expand out of the first barrel; wherein
the lens frame is movably disposed within the first barrel in a direction of an optical axis;
a metallic coil spring is provided extending in a rear-front direction between an end of the second barrel and the lens frame within the first barrel and the second barrel, and forwardly pushing the lens frame; and
a rear end of the coil spring is electrically connected to the second interconnect section.

8. The imaging apparatus according to claim 7, wherein the lens frame is movably disposed in a direction of an optical axis of the image-capturing optical system.

9. The imaging apparatus according to claim 7, wherein:
the lens frame is provided with a light intensity adjusting mechanism for adjusting a intensity of light in an optical path of the image-capturing optical system; and
the operational unit includes the light intensity adjusting mechanism.

10. The imaging apparatus according to claim 7, wherein:
the lens frame is provided with a shutter mechanism for opening and closing an optical path of the image-capturing optical system; and
the operational unit includes the shutter mechanism.

11. An imaging apparatus including a base, and a collapsible barrel provided to collapse into and expand out of the base, the barrel including a lens constituting an image-capturing optical system for introducing an optical image of an object; an imaging device for imaging the object; a lens frame for holding the lens; and an operational unit provided in the lens frame for performing an operation relating to image capture based on a control signal supplied thereto, the imaging apparatus comprising:
a flexible substrate provided within the lens barrel for supplying the control signal from an electric circuit provided outside the barrel to the operational unit;
wherein the flexible substrate comprises:
a first interconnect section to which the control signal is supplied; and
a second interconnect section provided separately from the first interconnect section and having an end connected onto the lens frame and another end electrically connected to a ground potential, wherein:

the barrel comprises a first sub-barrel adapted to collapse into and expand out of the base, and a second sub-barrel adapted to collapse into and expand out of the first sub-barrel;

a metallic accessory plate provided attached to an end of the second sub-barrel and having with an opening in the center constituting an optical path of the image-capturing optical system;

the lens frame is movably provided within the first sub-barrel in a direction of an optical axis;

a metallic coil spring is provided extending in a rear-front direction between an end of the second barrel and the lens frame within the first barrel and the second barrel, and forwardly pushing the lens frame; and a rear end of the coil spring is electrically connected to the second interconnect section.

12. The imaging apparatus according to claim 11, wherein a front end of the coil spring is brought into elastic contact with the accessory plate.

13. The lens barrel according to claim 5, wherein the lens frame is movably disposed in a direction of an optical axis of the image-capturing optical system.

14. The lens barrel according to claim 5, wherein:

the lens frame is provided with a light intensity adjusting mechanism for adjusting a intensity of light in an optical path of the image-capturing optical system; and the operational unit includes the light intensity adjusting mechanism.

15. The lens barrel according to claim 5, wherein:

the lens frame is provided with a shutter mechanism for opening and closing an optical path of the image-capturing optical system; and the operational unit includes the shutter mechanism.

16. The imaging apparatus according to claim 11, wherein the lens frame is movably disposed in a direction of an optical axis of the image-capturing optical system.

17. The imaging apparatus according to claim 11, wherein:

the lens frame is provided with a light intensity adjusting mechanism for adjusting a intensity of light in an optical path of the image-capturing optical system; and the operational unit includes the light intensity adjusting mechanism.

18. The imaging apparatus according to claim 11, wherein:

the lens frame is provided with a shutter mechanism for opening and closing an optical path of the image-capturing optical system; and the operational unit includes the shutter mechanism.

* * * * *